(12) United States Patent
Tax et al.

(10) Patent No.: US 11,907,925 B2
(45) Date of Patent: Feb. 20, 2024

(54) USER INTERFACE HANDOFF TO ENABLE FEATURE AT A TERMINAL

(71) Applicant: The Toronto-Dominion Bank, Toronto (CA)

(72) Inventors: David Samuel Tax, Toronto (CA); Milos Dunjic, Oakville (CA); Derek Richard Castell, Hamilton (CA); Anthony Haituyen Nguyen, Toronto (CA); Bryan Michael Gleeson, Bowmanville (CA); Jeffrey Aaron Ecker, North York (CA)

(73) Assignee: The Toronto-Dominion Bank, Toronto (CA)

( * ) Notice: Subject to any disclaimer, the term of this patent is extended or adjusted under 35 U.S.C. 154(b) by 31 days.

(21) Appl. No.: 17/142,605

(22) Filed: Jan. 6, 2021

(65) Prior Publication Data
US 2022/0215366 A1 Jul. 7, 2022

(51) Int. Cl.
| *G06Q 20/20* | (2012.01) |
| *G06Q 20/36* | (2012.01) |
| *G06Q 20/40* | (2012.01) |
| *G06Q 20/12* | (2012.01) |

(52) U.S. Cl.
CPC .......... *G06Q 20/20* (2013.01); *G06Q 20/127* (2013.01); *G06Q 20/36* (2013.01); *G06Q 20/40* (2013.01)

(58) Field of Classification Search
CPC ...... G06Q 20/20; G06Q 20/40; G06Q 20/127; G06Q 20/36
See application file for complete search history.

(56) References Cited

U.S. PATENT DOCUMENTS

| 9,875,469 B1* | 1/2018 | Chin ................. G06Q 20/3276 |
| 2013/0256403 A1* | 10/2013 | MacKinnon Keith ...................... G06Q 20/20 235/375 |
| 2015/0248664 A1* | 9/2015 | Makhdumi ........ G06Q 20/3274 235/380 |
| 2017/0140350 A1* | 5/2017 | Jamkhedkar ....... G06Q 20/3821 |

* cited by examiner

*Primary Examiner* — Peter Ludwig
*Assistant Examiner* — Reva R Moore
(74) *Attorney, Agent, or Firm* — Rowand LLP (57) ABSTRACT

In an aspect a computer-implemented method is described. The method may include: causing a point-of-sale terminal processing a transaction to display a machine-readable code, the machine-readable code encoding a web address; receiving a request from a device that scanned the machine-readable code, the request received at the web address and the request including data; determining, based on data encoded in the machine-readable code and data included in the request, that the transaction may be processed using a value-added service; and in response to determining that the transaction may be processed using the value-added service, enabling completion of the transaction using the value-added service.

20 Claims, 7 Drawing Sheets

```
┌─────────────────────────────────────────────────────────────────────┐
│ Cause a point-of-sale terminal processing a transaction to display  │
│ a machine-readable code, the machine-readable code encoding a web   │
│ address                                                             │
│                              802                                    │
└─────────────────────────────────────────────────────────────────────┘
                                  │
┌─────────────────────────────────────────────────────────────────────┐
│ Cause a device that scanned the machine-readable code to output an  │
│ interface that prompts for authorization to use the value-added     │
│ service to complete the transaction                                 │
│                              804                                    │
└─────────────────────────────────────────────────────────────────────┘
                                  │
┌─────────────────────────────────────────────────────────────────────┐
│ Receive a request from a device that scanned the machine-readable   │
│ code, the request received at the web address and the request      │
│ including data                                                      │
│                              806                                    │
└─────────────────────────────────────────────────────────────────────┘
                                  │
┌─────────────────────────────────────────────────────────────────────┐
│ Determine, based on data encoded in the machine-readable code and  │
│ data included in the request, that the transaction may be processed│
│ using a value-added service                                         │
│                              808                                    │
└─────────────────────────────────────────────────────────────────────┘
                                  │
┌─────────────────────────────────────────────────────────────────────┐
│ In response to determining that the transaction may be processed    │
│ using the value-added service, enabling completion of the          │
│ transaction using the value-added service.                          │
│                              810                                    │
└─────────────────────────────────────────────────────────────────────┘
```

FIG. 8

USER INTERFACE HANDOFF TO ENABLE FEATURE AT A TERMINAL

TECHNICAL FIELD

The present application relates to terminal devices and, more particularly, to systems and methods for enabling a feature on a terminal.

BACKGROUND

Operator terminals may sometimes be used to process a data transfer between accounts. By way of example, a point of sale (POS) terminal may be used to initiate a data transfer between accounts. Point of sale terminals are often simple electronic devices having limited functionality, such as limited input or output capabilities. For example, many POS terminals lack a complete keyboard and only have a keypad configured for numerical input. POS terminals also often have rudimentary display capabilities. This may cause challenges when deploying new features on such terminals.

DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

In an aspect, a processor-implemented method is disclosed. The method may be performed by a server. The method may include: causing a point-of-sale terminal processing a transaction to display a machine-readable code, the machine-readable code encoding a web address; receiving a request from a device that scanned the machine-readable code, the request received at the web address and the request including data; determining, based on data encoded in the machine-readable code and data included in the request, that the transaction may be processed using a value-added service; and in response to determining that the transaction may be processed using the value-added service, enabling completion of the transaction using the value-added service.

In some implementations, the method may include: causing a device that scanned the machine-readable code to output an interface that prompts for authorization to use the value-added service to complete the transaction; and receiving, from the device that scanned the machine-readable code and through the interface, an indication of authorization to use the value-added service. Enabling completion of the transaction using the value-added service may include configuring an account associated with a transfer token to enable the value-added service for the transfer token when the transfer token is used to process the transaction at the point-of-sale terminal.

In some implementations, determining that the transaction may be processed using the value-added service may include: sending a value-added service availability request to a server, the value-added service availability request including at least some of the data encoded in the machine-readable code and the data included in the request; and receiving, from the server, a response to the value-added service availability request, the response indicating that the transaction may be processed using the value-added service.

In some implementations, the machine-readable code may encode an amount of the transaction and wherein the value-added service availability request includes the amount of the transaction.

In some implementations, the data included in the request which is used to determine that the transaction may be processed using the value-added service may include one or both of a name and a phone number.

In some implementations, the data included in the request which is used to determine that the transaction may be processed using the value-added service may include a phone number.

In some implementations, determining that the transaction may be processed using a value-added service may be based on one or more of: a name included in the request; a merchant identifier associated with the machine-readable code; a telephone number included in the request; and an amount of the transaction encoded in the machine-readable code.

In some implementations, enabling completion of the transaction using the value-added service may include provisioning a wallet on the device that scanned the machine-readable code with a transfer token to be used to complete the transaction using the value-added service.

In some implementations, enabling completion of the transaction using the value-added service may include sending an indication that the transaction is to be completed using the value-added service to the point-of-sale terminal to cause the point-of-sale terminal to complete the transaction using the value-added service.

In some implementations, the value-added service may enable a transfer deferral that is not enabled without use of the value-added service.

In yet another aspect, a server is disclosed. The server may include a communications module. The server may include a processor coupled with the communications module. The server may include a memory coupled to the processor and storing processor-executable instructions which, when executed by the processor, configure the server to perform a method described herein.

In another aspect, a computer-readable storage medium may be provided. The computer-readable storage medium may include processor-executable instructions which, when executed, configure a processor to perform a method described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Example embodiments of the present application are not limited to any particular operating system, system architecture, mobile device architecture, server architecture, or computer programming language.

Sometimes it may be necessary or desirable to use a feature at a terminal, such as a point-of-sale (POS) terminal. However, some such features may require advanced user input in order to be enabled at a POS terminal. By way of example, the feature may be a value-added service that is not available to all users of the POS terminal. To be eligible to use the feature, input may need to be received from a customer to confirm that the customer is eligible to use the feature. In some instances, the POS terminal may be ill-suited to receive such input. For example, the POS terminal may have limited input or output interfaces and the input and/or output interfaces included on the POS terminal may be ill-suited for receiving the input required for enabling the feature.

In order to facilitate entry of the input, as will be explained below, a user interface may effectively be handed off to a customer device from a POS terminal. By handing off the user interface, the input capabilities of the customer device may be used to enable the feature. For example, in some instances, a keyboard (such as a physical keyboard or virtual keyboard) may be used to enable the feature. By way of further example, in some instances, other resources on or associated with the customer device may be used. For example, data that is stored on or accessible from the customer device may be used to facilitate enabling the feature or an application that is stored on the customer device may be used to facilitate enabling the feature (e.g., by using in-app authentication to confirm the identity of a customer). By way of further example, in some instances, biometric authentication configured on the customer device may be used to facilitate enabling the feature on the POS terminal.

Accordingly, handing off a user interface to a customer device from a POS terminal may allow a feature to be enabled at a POS terminal even if the POS terminal has limited input and/or output capabilities. Additionally, or alternatively, by offloading at least some of the operations that need to be performed to enable the feature, customer contact with the terminal may be reduced. Further, such offloading may reduce the amount of time that the terminal is used by the customer or for a particular transaction. Minimizing customer contact with the terminal may be useful to, for example, avoid the spread of germs and viruses. Minimizing the amount of time that the terminal is in use for a particular transaction may allow the terminal to be used for a greater number of transactions.

Figure 1:
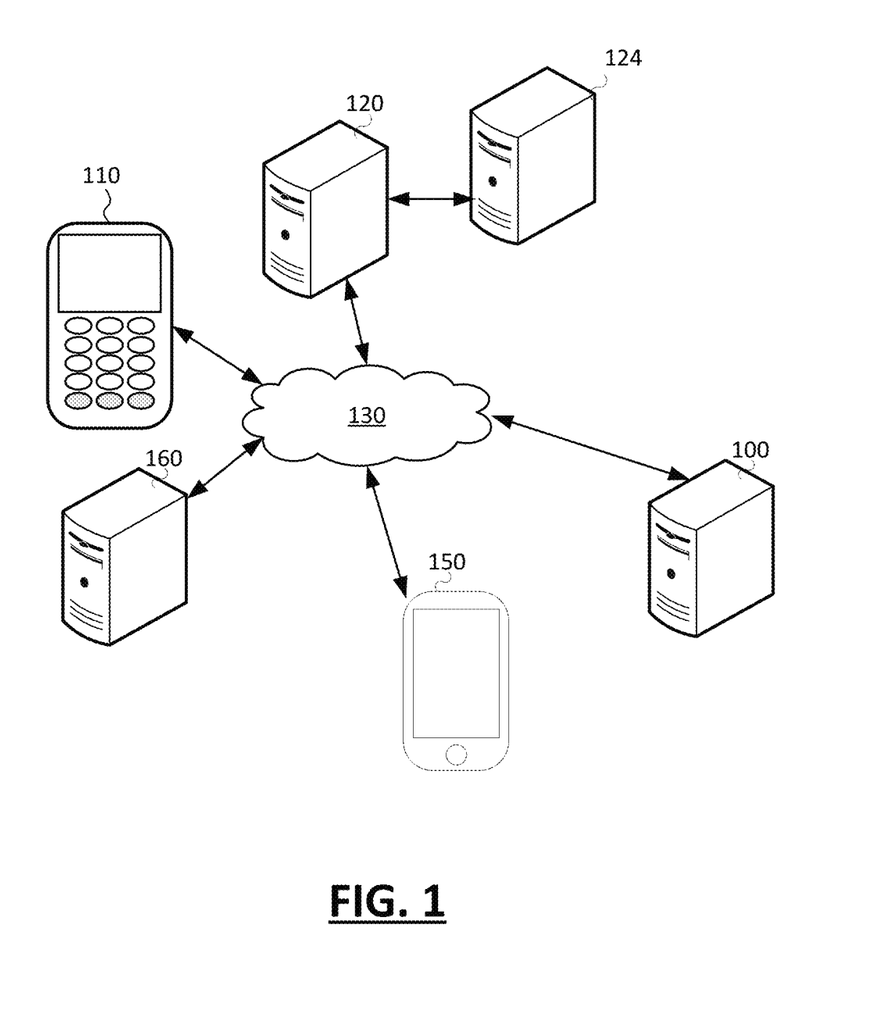
FIG. 1 is a schematic diagram illustrating an operating environment of an example embodiment.

FIG. 1 is a schematic operation diagram illustrating an operating environment of an example embodiment.

As illustrated in FIG. 1, a POS terminal 110 may communicate with a remote interface server 100. Such communication may be by way of the network 130. The remote interface server 100 may also communicate with a customer device 150 and such communication may be by way of a network, such as the network 130.

The customer device 150 is a computing device that is associated with a customer. By way of example, the customer device 150 may include any one or more of: a mobile device, a tablet computer, a laptop computer, a wearable computer, or a computing device of another type.

As will be described in greater detail below, the remote interface server 100 may interact with the customer device 150 to allow a customer to provide input at the customer device 150 so that at least some input need not be provided at the POS terminal 110 directly. Accordingly, the remote interface server 100 may be or may be associated with a web server.

The remote interface server 100 may also communicate with the POS terminal 110 based on the input received from the customer device 150 to allow the POS terminal 110 to process a transaction that is based on the received input. For example, in at least some implementations, the remote interface server 100 may configure the POS terminal 110 to enable a feature, such as a value-added service. Such communication may, for example, be by way of a network, such as the network 130. In some instances, the remote interface server 100 may communication with another server, which may be referred to as a value-added service (VAS) server 160. The VAS server 160 may be configured to determine, based on input received from the customer device 150, whether the customer is eligible for the value-added service.

As illustrated, a point-of-sale (POS) terminal 110 may communicate with a transfer rail 120 which relays transaction data to an appropriate issuer system 124. Such communication may be via a network, such as the network 130. The transfer rail 120 may also be referred to as a payment rail.

The point-of-sale terminal is associated with an acquirer and the communication between the POS terminal 110 and the transfer rail 120 may be by way of a back-end acquirer system. The POS terminal 110 may be located at a location that is associated with a merchant. By way of example, the merchant may be a store, restaurant, gym, etc. The acquirer is a merchant bank that accepts deposits associated with transactions made at the point-of-sale terminal and facilitates settlement and deposit of those deposits into an account associated with the merchant.

While a single transfer rail 120 is illustrated in FIG. 1, in practice the POS terminal 110 may communicate with multiple transfer rails. By way of example, the transfer rail 120 may include any one or a combination of Amex™, Visa™ and/or Mastercard™. Other transfer rails may also be used. The POS terminal and/or a back-end acquirer system in communication with the POS terminal may, after obtaining data from a physical token, such as a value transfer card or a mobile device having a representation of a payment card which has engaged a physical token reader provided at the POS terminal, determine which of the transfer rails is to be used. For example, the POS terminal/acquirer system may determine that the physical token is associated with Visa™ and may, in response, select the Visa™ payment rail or it may, instead, determine that the physical token is associated with Mastercard™ and select the Mastercard™ payment rail.

After a transfer rail is identified, the POS terminal/acquirer system sends the transfer rail a message. The message may be sent through a network, such as the network 130. The message includes a value amount representing an amount of value that is to be transferred to complete a transaction and physical token data such as a primary account number (PAN) associated with a physical token. The transfer rail identifies an associated issuer based on the physical token data and communicates with the identified issuer to process the transaction. More particularly, the transfer rail 120 routes the message received from the POS terminal to an issuer system 124 for the identified issuer. The issuer system then determines whether the transaction is approved or denied based on pre-defined rules. The rules may, for example, consider any one or more of: whether the cardholder has available funds, whether the merchant is of a type that is permitted, whether the transaction violates any spending limits, etc.

When the issuer system determines whether to approve or deny the transaction, it sends a message indicating the result of this determination to the POS terminal 110 via the transfer rail 120. The result may then be displayed or otherwise output at the POS terminal 110.

The issuer system 124, VAS server 160, point-of-sale terminal 110, customer device 150, remote interface server 100, and the transfer rail 120 may be in geographically disparate locations. Put differently, each of issuer system 124, VAS server 160, point-of-sale terminal 110, customer device 150, remote interface server 100, and the transfer rail 120 may be remote from others of the issuer system 124, VAS server 160, point-of-sale terminal 110, customer device 150, remote interface server 100, and the transfer rail 120.

The issuer system 124, VAS server 160, point-of-sale terminal 110, customer device 150, remote interface server 100, and the transfer rail 120 may each be both a computer system and a computing device.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, or the like. Additionally, or alternatively, the network 130 may be or may include one or more payment networks. The network 130 may, in some embodiments, include a plurality of distinct networks. For example, communications between certain of the computer systems may be over a private network whereas communications between other of the computer systems may be over a public network, such as the Internet.

Figure 2:
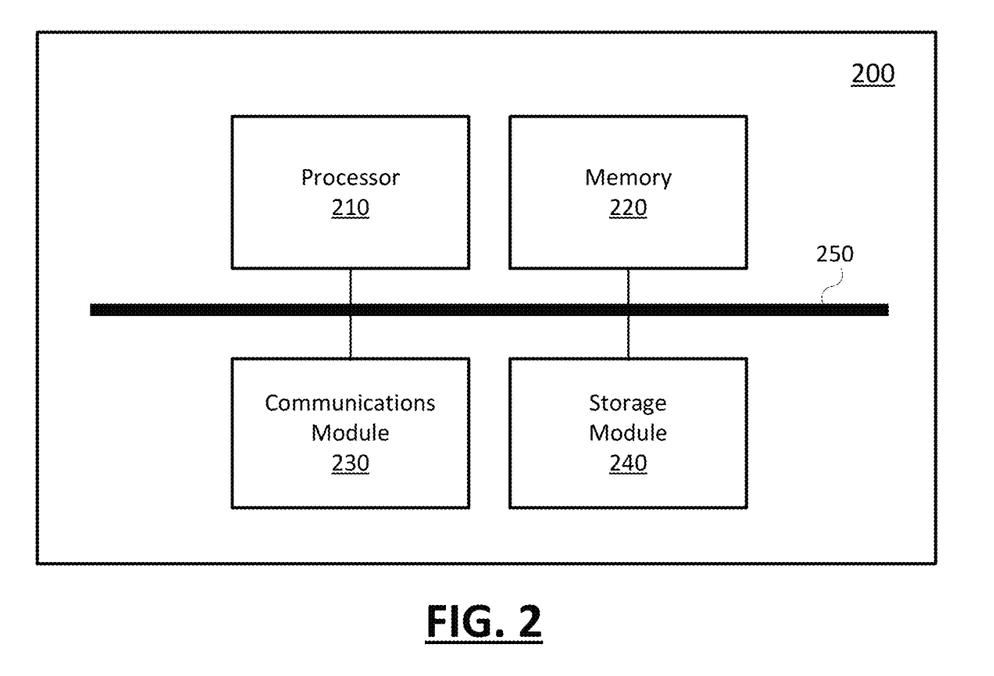
FIG. 2 is high-level schematic diagram of a computing device.

Referring now to FIG. 2, a high-level operation diagram of an example computing device 200 will now be described. The example computing device 200 may be exemplary of the issuer system 124, VAS server 160 point-of-sale terminal 110, customer device 150, remote interface server 100, and/or transfer rail 120.

The example computing device 200 includes numerous different modules. For example, as illustrated, the example computing device 200 may include a processor 210, a memory 220, a communications module 230, and/or a storage module 240. As illustrated, the foregoing example modules of the example computing device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 230 may allow the example computing device 200 to communicate using near-field communication (NFC), via WiFi™, using Bluetooth™, or via some combination of one or more networks or protocols. In some embodiments, all or a portion of the communications module 230 may be integrated into a component of the example computing device 200. For example, the communications module may be integrated into a communications chipset.

The storage module 240 allows the example computing device 200 to store and retrieve data. In some embodiments, the storage module 240 may be formed as a part of the memory 220 and/or may be used to access all or a portion of the memory 220. Additionally, or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally, or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely. The storage module may also be referred to as a data store.

Software comprising instructions is executed by the processor 210 from a computer-readable medium. For example, software may be loaded into random-access memory from persistent storage of the memory 220. Additionally, or alternatively, instructions may be executed by the processor 210 directly from read-only memory of the memory 220.

The computing device 200 will include other components apart from those illustrated in FIG. 2 and the specific component set may differ based on whether the computing device 200 is operating as the issuer system 124, VAS server 160, point-of-sale terminal 110, customer device 150, remote interface server 100, and/or the transfer rail 120. For example, the computing device 200 may include one or more input modules, which may be in communication with the processor 210 (e.g., over the bus 250). The input modules may take various forms including, for example, a mouse, a microphone, a camera, a touchscreen overlay, a button, a sensor, etc. By way of further example, the computing devices 200 may include one or more output modules, which may be in communication with the processor 210 (e.g., over the bus 250). The output modules include one or more display modules which may be of various types including, for example, liquid crystal displays (LCD), light emitting diode displays (LED), cathode ray tube (CRT) displays, etc. By way of further example, the output modules may include a speaker.

Where the computing device 200 is operating as the POS terminal 110, the computing device 200 may include a physical token reader. The physical token reader is configured for reading a physical token such as a value transfer card or a mobile device having a representation of a value transfer card stored thereon. The physical token reader may be or include a card slot which facilitates communication with the physical token through physical contact and/or a contactless reader such as a near field communication (NFC) reader which may facilitate communication with the physical token through communication protocols that do not rely on physical contact with the physical token.

As noted above, the computing device 200 may include one or more input modules and/or one or more output modules. For example, where the computing device 200 is operating as the POS terminal 110 it may include one or more input modules such as a touchscreen display and/or a keypad that may be configured to receive user input. The input modules may be used by an operator, for example. Where the computing device 200 is operating as the POS terminal 110, it may also include a display module which is used for displaying a user interface that facilitates payment processing.

In at least some implementations, the customer device 150 may have one or more input modules that are not available on the POS terminal. For example, the POS terminal may not support keyboard-based input whereas the customer device 150 may support keyboard-based input.

When the computing device 200 is operating as the customer device 150, the input modules may include a camera or scanner than may be used to scan a machine-readable code. As will be explained more fully below, when the machine-readable code is scanned, it may direct the customer device to the remote interface server 100 which may provide a user interface to the customer device 150. The user interface may be configured to receive input of an indication to separate a transaction into multiple transaction parts. The user interface may, additionally, or alternatively, be configured to receive input of one or more parameters indicating how the transaction is to be separated.

Figure 3:
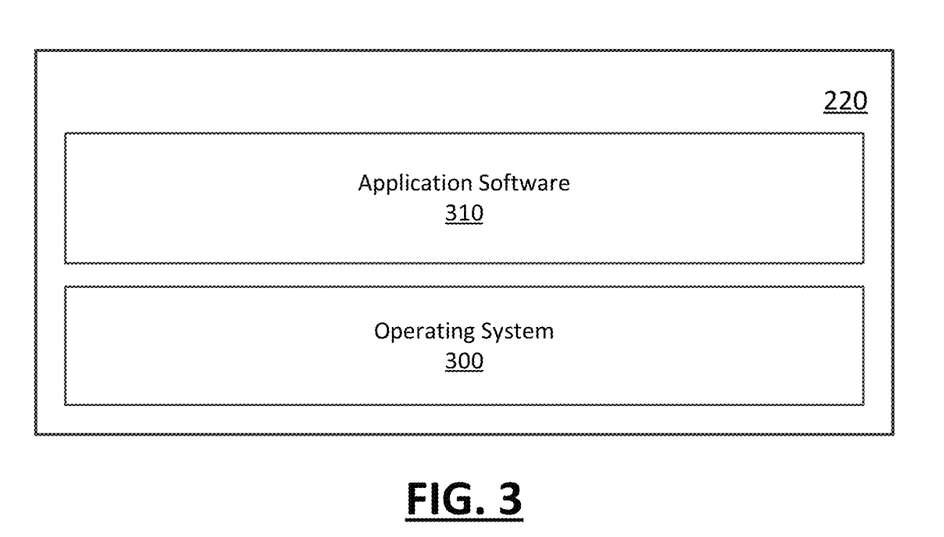
FIG. 3 shows a simplified organization of software components stored in a memory of the computing device of FIG. 2.

FIG. 3 depicts a simplified organization of software components stored in the memory 220 of the example computing device 200 (FIG. 2). As illustrated, these software components include an operating system 300 and an application software 310.

The operating system 300 is software. The operating system 300 allows the application software 310 to access the processor 210 (FIG. 2), the memory 220, and the communications module 230 of the example computing device 200 (FIG. 2). The operating system 300 may be, for example, Google™ Android™, Apple™ iOS™, UNIX™, Linux™, Microsoft™, Windows™, Apple OSX™ or the like.

The application software 310 adapts the example computing device 200, in combination with the operating system 300, to operate as a device performing a particular function. For example, the application software 310 may cooperate with the operating system 300 to adapt a suitable embodiment of the example computing device 200 to operate as the issuer system 124, VAS server, point-of-sale terminal 110, customer device 150, remote interface server 100, and/or the transfer rail 120.

While a single application software 310 is illustrated in FIG. 3, in operation the memory 220 may include more than one application software 310 and different application software 310 may perform different operations.

Figure 4:
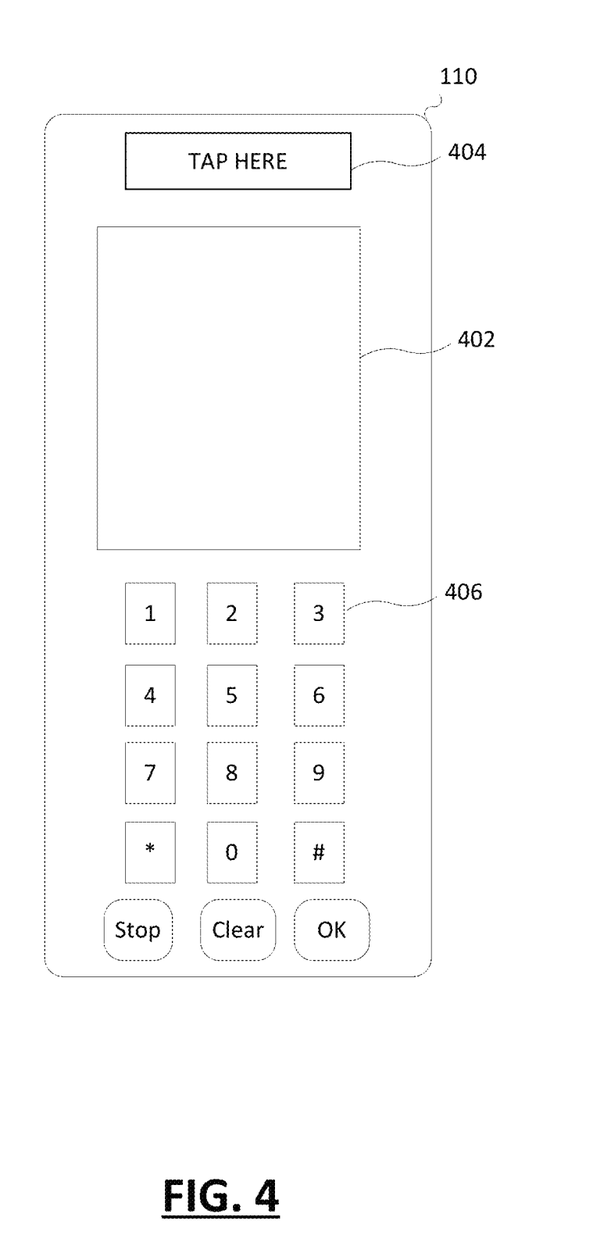
FIG. 4 shows an example point-of-sale terminal.

Referring now to FIG. 4, an example POS terminal 110 is illustrated. The POS terminal includes a physical token reader which, in the example, includes a wireless physical token reader configured for near field communications. The physical token reader may be used by tapping a physical token at a particular region 404 of the POS terminal 110. The particular region 404 is a sensing region. That is, when the physical token is placed at or near the particular region, the POS terminal 110 is able to communicate with the physical token to obtain physical token data.

The POS terminal 110 includes one or more output modules. In the example, the output modules include a display module 402. The display module 402 may, in at least some implementations, be a touchscreen display. In such cases, the display module 402 is both an output module and an input module.

The POS terminal 110 may include an input module of another type instead of or in addition to a touchscreen display. By way of example, the displayed POS terminal 110 includes a keypad 406. The input module may be used by an operator in order to setup a transaction. By way of example, the operator may input an amount of a transaction. The amount of the transaction may be a base amount of the transaction. The base amount of the transaction is an amount of the transaction that excludes any optional amounts, such as tips. In some instances, the POS terminal may include or be associated with a scanner such as a bar-code reader which may be used to scan bar-codes that are displayed on tags associated with merchandise. In such instances, the operator may not input the base amount of the transaction directly; the base amount may be determined by a computer having access to price data.

By way of further example, in some instances, the POS terminal 110 may be associated with a computer system which allows an operator to input order information that may be used to calculate a base amount that is provided directly to the POS terminal 110. For example, the computer system may be a merchant terminal that may allow an operator to select items for an order from a predefined list, such as a list associated with a menu, and the merchant terminal may then calculate a base amount for a transaction and send it to the POS terminal.

The POS terminal 110 may, in some instances, include other physical token readers apart from the wireless physical token reader. For example, a card slot may be included and may be arranged so that when a value transfer card is inserted in the card slot, one or more pins or pads associated with the card may align with pads or pins provided in the POS terminal 110 that are intended for reading data from the card.

By way of further example, in some instances, the physical token readers may include a magnetic reader which is configured for reading data from a magnetic strip associated with a value transfer card.

Figure 5:
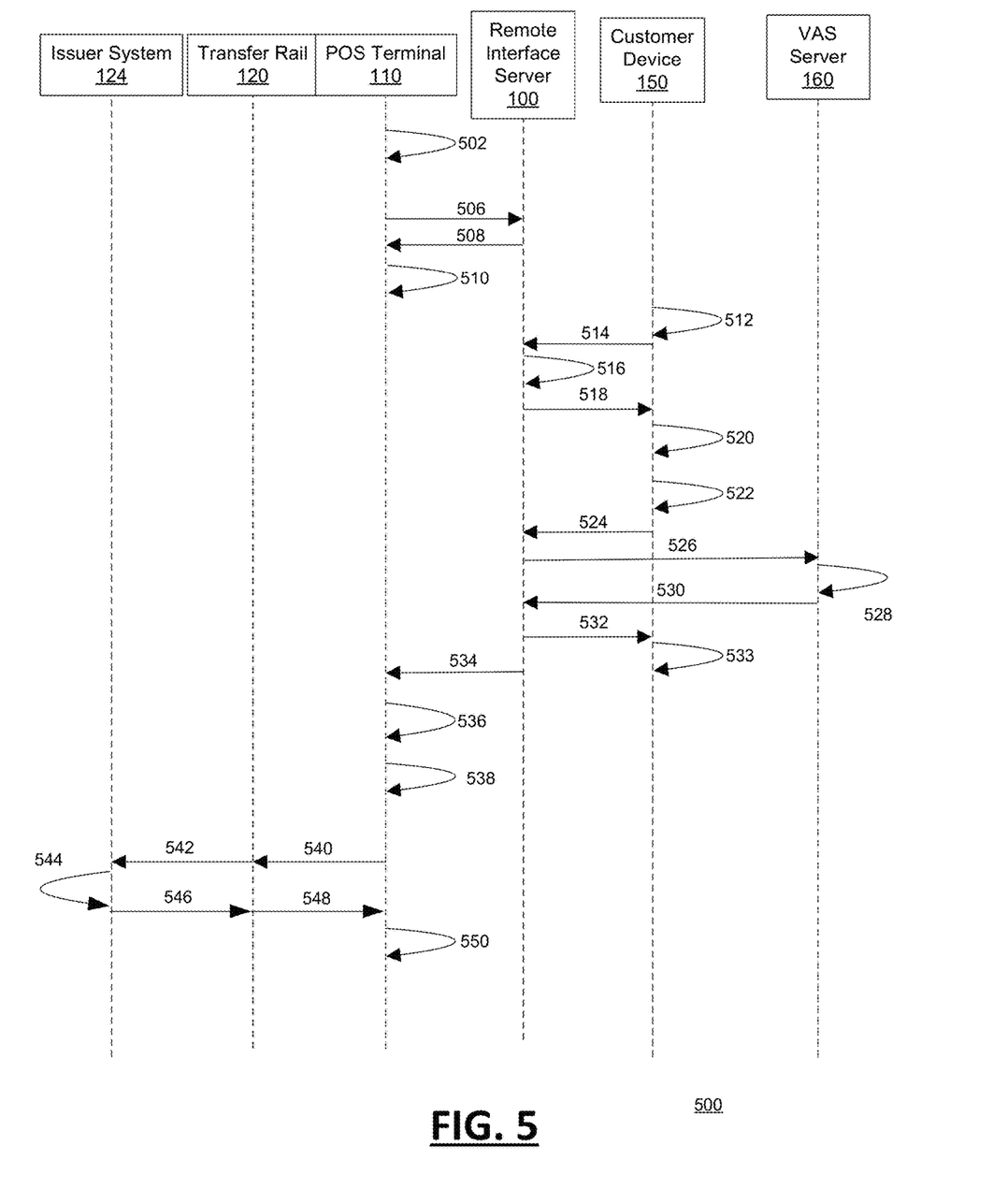
FIG. 5 shows a sequence diagram illustrating messages exchanged between systems illustrated in FIG. 1.

Reference is now made to FIG. 5. FIG. 5 illustrates a sequence diagram 500, similar to a Unified Modelling Language (UML) sequence diagram, that shows how the customer device 150, remote interface server 100, VAS server 160, POS terminal 110, transfer rail 120 and the issuer system 124 may communicate in some embodiments, and, in particular, depicting messages exchanged therebetween in processing a transaction. That is, such messages may be used for initiating a data transfer or initiating a transfer of value.

The operations that are performed by the customer device 150, remote interface server 100, POS terminal 110, transfer rail 120 and the issuer system 124 in exchanging the messages illustrated in the sequence diagram and/or in performing various operations referred to herein, may be performed by processors executing processor-executable instructions stored in a memory. The processors may be coupled to a communications module which may be used in sending and/or receiving the various messages.

In the following description of the sequence diagram 500, discussion is made of various messages being sent and received via a computer network such as, for example, network 130. In some embodiments, the exchanged messages may be implemented as messages. However, in other embodiments, some or all of the illustrated messages may not correspond to messages per se when sent over the computer network but may instead be implemented using techniques such as for example remote procedure call (RPC) and/or web services application programming interfaces (APIs). For example, it may be that various message pairs illustrated in FIG. 5 correspond to an RPC or a web service API call and a reply or callback in response to that call.

As illustrated, at the beginning of sequence, at 502, the POS terminal 110 may receive transaction setup data, such as a base amount of a transaction. The base amount may be received through an input module that is configured for receiving operator input. The input module may be provided on the POS terminal or on an associated system that is communicably coupled with the POS terminal 110. By way of example, in some implementations, the base amount may be received via direct input on a keypad 406 (FIG. 4) provided at the POS terminal. In other instances, another point of sale system may receive input that may be used to determine the base amount (e.g., by scanning a bar code or by selecting an item for purchase from a list of available items) and the base amount may then be sent to the POS terminal 110. A base amount of a transaction may be an amount of a transaction that a customer is required to pay and the base amount of the transaction may exclude an optional amount (also known as a voluntary amount and/or a variable amount), such as an amount for a tip. The base amount may, in at least some implementations, include applicable tax.

In some instances, the transaction setup data may include an input of an indication of whether a value-added service is being requested. For example, an operator may input such an indication to the POS terminal in order to trigger the operations described below which enable the value-added service at the POS terminal.

When the value-added service is requested, the POS terminal 110 may then obtain and display a machine-readable code. In some implementations, the POS terminal 110 may obtain the machine-readable code from the remote interface server 100. For example, the POS terminal 110 may send a message 506 to the remote interface server 100. The message 506 may be referred to as a code request message. The message 506 may include an indication of the base amount of transaction. The indication of the base amount of the transaction may directly indicate the base amount of the transaction or it may be an identifier, such as a location identifier, which indicates where the base amount of the transaction may be obtained. The message 506 may include one or more identifier such as a point-of-sale terminal identifier and/or a merchant identifier. The message 506 may also include random data, such as a random number which may be produced by a random number generator.

In some implementations, the message 506 may include an indication of itemized receipt data. Itemized receipt data may itemize all products or services that are associated with the base amount of the transaction. By way of example, the itemized receipt data may indicate specific items that were ordered from a restaurant. The indication of the itemized receipt data may directly indicate the itemized receipt data or it may be an identifier, such as a location identifier, which indicates where the itemized receipt data may be obtained.

The remote interface server 100 receives the message 506 which includes the base amount of the transaction. In response to receiving the message 506, the remote interface server 100 generates a machine-readable code based on the contents of the message 506.

The machine-readable code may, in some implementations, be a quick response (QR) code. The machine-readable code may encode various data. For example, the machine-readable code may encode the base amount of the transaction. The machine-readable code may encode a transaction identifier. The machine-readable code may encode a point-of-sale terminal identifier and/or a merchant identifier. The machine-readable code may include random data such as the random data provided in the message 506. The machine-readable code may encode the indication of the itemized receipt data.

The machine-readable code may encode a link such as, for example, a web address. The web address is an address associated with a web server that is provided by or is associated with the remote interface server 100. The web address may be a uniform resource locator (URL). The web address may be associated with an interface. That is, the web address may be an address for a web server that serves the interface to a device that has scanned the machine-readable code.

The machine-readable code may encode security or verification data. For example, the machine-readable code may encode a hash. The remote interface server 100 may generate the hash based on other data encoded in the machine-readable code. For example, the hash may be generated based on any one or a combination of: the link/web address, the base amount of the transaction, the point-of-sale terminal identifier and/or a merchant identifier, the transaction identifier and/or the random data.

The machine-readable code may be digitally signed by the remote interface server 100 and/or may encode a digital signature.

In some implementations, at least some of the data that is encoded in the machine-readable code may be encoded as parameters associated with the web address that is encoded in the machine-readable code. For example, any one or a combination of: the hash, the base amount of the transaction, the point-of-sale terminal identifier, the merchant identifier, the transaction identifier, the indication of the itemized receipt data, the random data and/or the digital signature may be encoded as parameters, such as URL parameters, for the URL. Conveniently, in this way, when a customer scans the machine-readable code with a customer device 150, the customer device 150 may be directed to the web address associated with the remote interface server 100 and may pass the web address such data as parameters.

The remote interface server 100 may, after preparing the machine-readable code, send a message 508 to the POS terminal 110. The message 508 includes the machine-readable code. In sending the machine-readable code to the POS terminal 110, the remote interface server 100 causes the machine-readable code to be displayed at the POS terminal 110 which is processing the transaction. The POS terminal 110 receives the message 508 and, in doing so, receives the machine-readable code. The POS terminal 110 may, at 510, display the machine-readable code at a display module 402 (FIG. 4) associated with the POS terminal 110.

The operator of the POS terminal 110 may then ask a customer to scan or read the machine-readable code using a customer device 150 if they would like to enable a value-added service at the POS terminal.

A customer may point a camera or other scanner associated with the customer device 150 at the displayed machine-readable code while a reader application is enabled on the customer device 150. The reader application may, in some instances be a general camera application. In other instances, the reader application may be an application of another type. For example, the reader application may be an application associated with a financial institution and/or a value-added service provider.

The customer device 150 at 512 obtains a representation of the machine-readable code. That is, the reader application may decode the machine-readable code in order to obtain data contained therein. In doing so, the reader application may identify the web address included in the machine-readable code. The reader application may then provide a selectable option to activate the web address or it may automatically activate the web address.

The customer device 150 which scanned the machine-readable code, may then send a message 514 to the remote interface server 100. The message may be a request to retrieve content and, more particularly, a request to retrieve an interface. The request may be in the form of an HTTP GET in some implementations. The request may be sent by a web browser associated with the customer device 150 in at least some implementations. For example, the reader application may pass a URL and any associated URL parameters decoded from the machine-readable code to the web browser which then uses the URL, complete with any parameters, to retrieve the interface.

The remote interface server 100 receives the message 514. That is, the remote interface server 100 receives a request from the customer device 150 for the interface and receives any data that may be passed to the remote interface server 100 as, for example, URL parameters. Accordingly, the request received at the remote interface server 100 may reference any one or a combination of: the base amount of the transaction, the transaction identifier, the hash, the digital signature, the random data, the point-of-sale identifier, the indication of the itemized receipt data and/or the merchant identifier.

In some implementations, in response to receiving the message 514, the remote interface server 100 may, at 516, verify the message 514. That is, the remote interface server 100 may verify the request. Such verification may be based on the hash, the digital signature and/or the random data. The verification may, for example, ensure that the request is not associated with a replay attack, that the data has not been tampered with and/or that the request was generated based on an authorized machine-readable code. The verification that the request was generated based on an authorized machine-readable code may be based on the digital signature. That is, the remote interface server 100 may verify that the signature is a valid signature. The verification that the request was not associated with a replay attack may rely on the random data. The hash may be used to verify that the data has not been tampered with.

After the remote interface server 100 verifies the request and, in response to receiving the request, the remote interface server may cause the device that scanned the machine-readable code to output an interface that is intended to obtain data required to enable the value-added service. For example, the remote interface server may cause the device that scanned the machine-readable code to output an interface that prompts for authorization to use the value-added service to complete the transaction. For example, the remote interface server 100 sends a message 518 to the customer device 150. The message may include or reference the interface.

The interface may be a web page and may be displayed in a web browser on the customer device 150, in some implementations. In other implementations, the interface may be displayed in another application such as a financial institution application or a value-added service application.

In some instances, the interface may prompt for input representing consent to enable the value-added service. The input may be in the form of a selectable interface element, such as a button.

In some instances, the interface that is output on the customer device 150 may prompt for input of customer data such as, for example, a name, address, messaging address such as an email address, and/or a telephone number. The interface may be configured to receive input of such customer data through one or more fields or other interface elements displayed in the interface.

In some instances, the interface that is output on the customer device 150 may prompt for input of transaction token data for an existing transaction token, such as an existing payment card, that a customer would like to use to complete the transaction together with the value-added service. By way of example, token data such as a primary account number (PAN), expiry date, name, and/or security code associated with a token may be input through the interface.

In some instances, an application that is displaying the interface may already have access to customer data and such customer data may be used instead of, or in addition to receiving such customer data through interface elements. For example, the application displaying the interface may, in some implementations, be associated with a financial institution. Such an application may have access to customer data through a financial institution server and such customer data may be used to obviate or reduce the need for user input of customer data.

Figure 6:
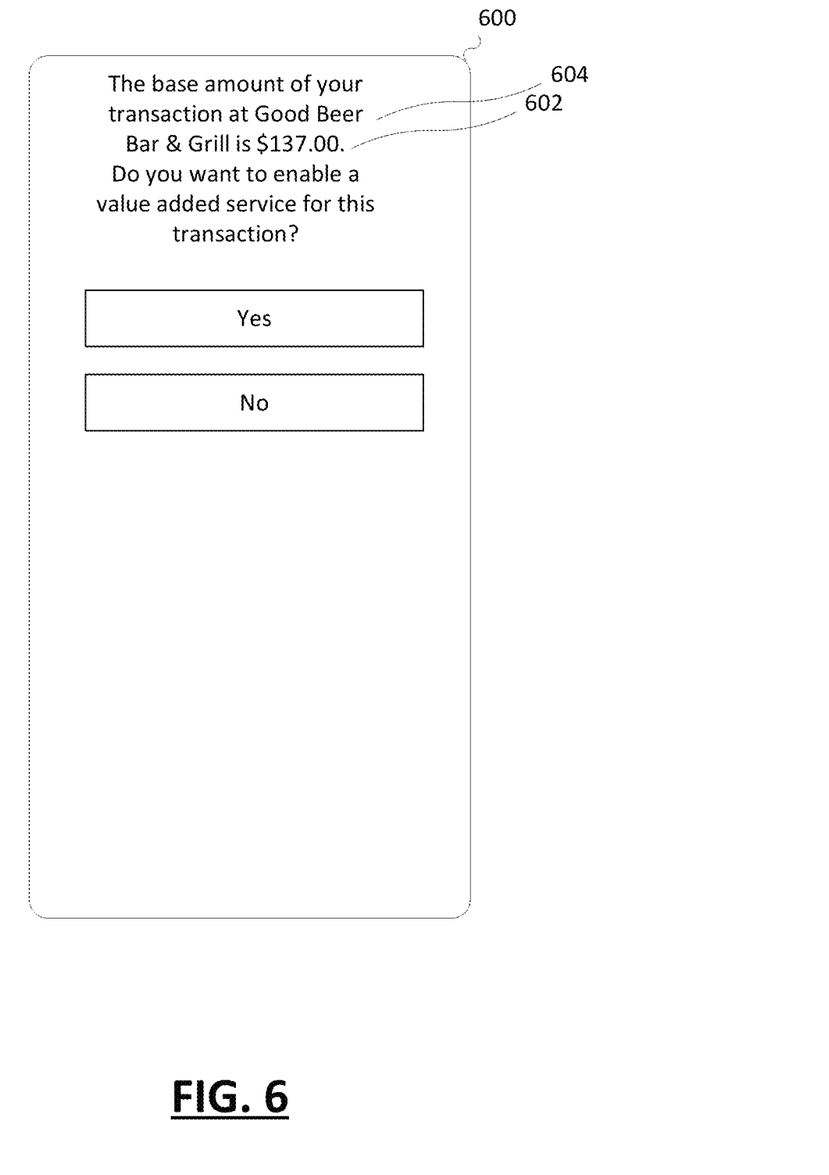
FIG. 6 shows an example interface that may be displayed on a customer device.
Figure 7:
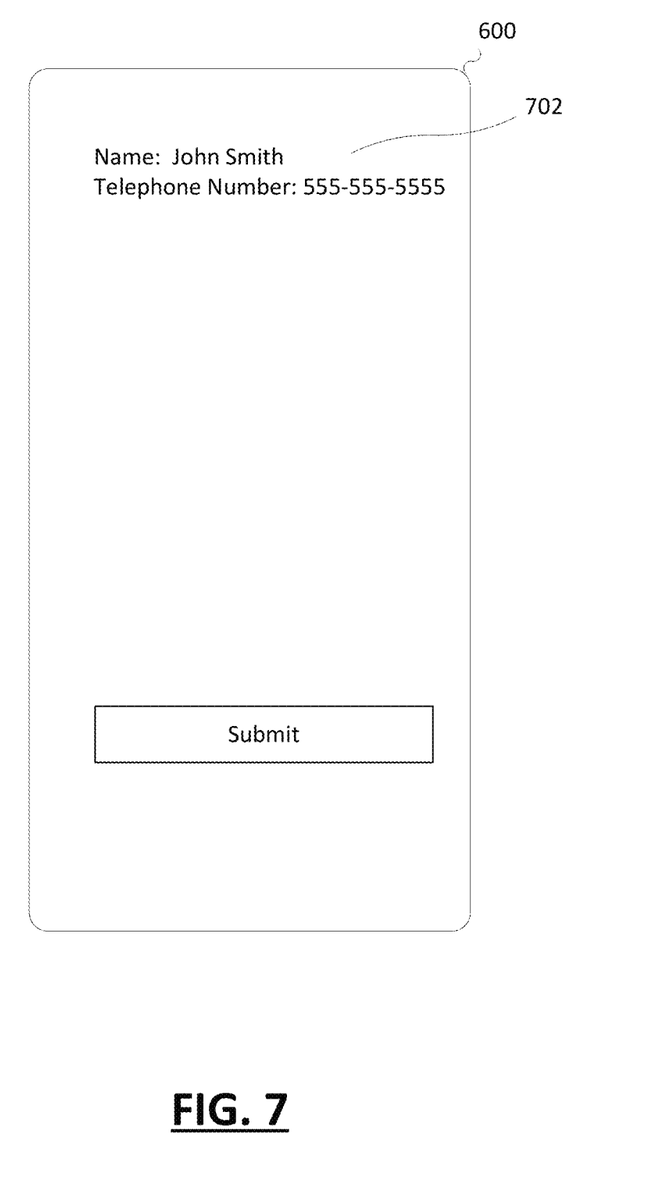
FIG. 7 shows a further screen of an example interface that may be displayed on a customer device.

An example interface 600 is illustrated in FIGS. 6 and 7. The interface may include a base amount indicator 602 indicating the base amount of the transaction and/or a merchant indicator 604 indicating a merchant associated with the transaction as indicated by the merchant identifier.

The interface may be a generic interface that is the same for all merchants or a plurality of merchants or it may be a merchant-specific interface that is applicable for a particular merchant. For example, while not illustrated in FIGS. 6 to 7, the interface 600 may include a logo for the merchant. By way of example, the interface 600 may be retrieved by the remote interface server 100 from a data store or memory based on the merchant identifier.

The interface may include a prompt. The prompt may, as illustrated in FIGS. 6 to 7, prompt for input of an authorization to use the value-added service to complete the transaction. The prompt may, as further illustrated in FIGS. 6 to 7, prompt for input of customer data 702 (FIG. 7).

In some implementations, the interface, which may include the prompt(s), may generate one or more of the prompts audibly to assist a visually-impaired operator of the customer device 150. That is, the interface may be output at a speaker associated with the customer device 150.

Referring again to FIG. 5, the customer device 150 receives the message 518 and displays the interface at 520.

The customer device 150 then receives, at 522, input via the interface. The input may be a response to the prompt(s) and may be received via an interface element provided in the interface, such as a field, checkbox, button, etc. The customer device 150 then sends one or more messages 524 to the remote interface server 100. The message(s) 524 may be or include a request. The request may be received at the web address (i.e., at the remote interface server 100) and may be a request to use a value-added service at the POS terminal 110. The message(s) 524 may include an indication of authorization to use the value-added service. The message 524 may be based on input received through the interface 600.

The request to use the value-added service may include data. Such data may be included in one or more of the messages 524. The data may include, for example, customer data. The customer data may include any one or a combination of: a name, address, messaging address such as an email address, and/or a telephone number.

The remote interface server 100 may then determine whether the transaction may be processed using a value-added service. The determination may be made automatically based on data included in the request such as, for example, the customer data. By way of example, any one or more of the following may be used in the determination: a name, address, messaging address such as an email address, and/or a telephone number. In some instances, the determination may be based on whether the customer represented by the customer data has used the value-added service in the past and/or whether such a customer has on ongoing obligation associated with a past use of the value-added service and/or has broken a rule associated with use of the value-added service in the past. For example, in some instances, a customer may not be eligible to use the value-added service if that customer has broken a rule associated with the use of the value-added service in the past. By way of example, in some instances, the value-added service may enable a transfer deferral that is not enabled without use of the value-added service. For example, the value-added service may be a resource transfer deferral service in which a transfer of resources such as a payment can be delayed through use of the service. In at least some such implementations, if a past transfer that was to have been made to use the value-added service did not occur then the value-added service may not be used to process the transaction.

Accordingly, in some implementations, determining whether the transaction may be processed using a value-added service may include identifying a customer based on customer data. Further, determining whether the transaction may be processed using a value-added service may include determining whether the identified customer is eligible for the value-added service.

Other data may be used to determine whether the transaction may be processed using the value-added service apart from customer data. For example, in some instances, in at least some implementations, such determination may be made based on data encoded in the machine-readable code. By way of example, the determination may be made based on any one or combination of: an amount of the transaction, a transaction identifier, a point-of-sale terminal identifier, a merchant identifier and/or an indication of itemized receipt data. For example, the value-added service may only be available if such data satisfies predetermined criteria. By way of example, the predetermined criteria may require that, for the value-added service to be enabled, the merchant identifier correspond to a merchant on a list of supported merchants. By way of further example, the predetermined criteria may require that, for the value-added service to be enabled, the merchant identifier not correspond to a merchant on a list of unsupported merchants. By way of further example, the predetermined criteria may require that, for the value-added service to be enabled, one or more of the items identified in the itemized receipt data must meet determined criteria. For example, the value-added service may be available for certain products or services but not for others.

By way of further example, the predetermined criteria may require that, for the value-added service to be enabled, an amount of the transaction must satisfy certain criteria. The criteria may include a threshold. By way of example, in some instances, the value-added service may only be enabled if an amount of the transaction is less than a threshold. By way of further example, in some instances, the value-added service may only be enabled if an amount of the transaction is greater than a threshold. By way of further example, in some instances, the value-added service may only be enabled if an amount of the transaction is within a defined range.

The remote interface server 100 may directly or indirectly determine whether the value-added service is available for the transaction. For example, the remote interface server 100 may directly determine whether it is available by evaluating the data included in the message(s) 524 and/or the data encoded in the machine-readable code against pre-determined criteria, which may be stored in memory associated with the remote interface server 100. In other implementations, such as that illustrated in FIG. 5, the determination may be made indirectly. For example, a message 526 may be sent from the remote interface server 100 to a VAS server 160. The message may be or include a value-added service availability request. The value-added service availability request may include at least some of the data encoded in the machine-readable code. By way of example, the request may include any one or combination of: an amount of the transaction, a transaction identifier, a point-of-sale terminal identifier, a merchant identifier and/or an indication of itemized receipt data.

The value-added service availability request may include at least some customer data. By way of example, the request may include any one or combination of: a name, address, messaging address such as an email address, and/or a telephone number.

The VAS server 160 may then determine whether the transaction may be processed using the value-added service at operation 528. This determination may be made in the manner described previously. For example, it may be made based on the customer data and/or the data encoded in the machine-readable code. The determination may be made based on defined criteria.

After the VAS server 160 has made the determination, the VAS server 160 sends a message 530 to the remote interface server 100. The message 530 is or includes a response to the value-added service availability request. The response indicates whether the transaction may be processed using the value-added service. For example, where it has been determined at operation 528 that the transaction may be processed using the value-added service, the response provided in the message 530 may indicate that the transaction may be processed using the value-added service. The message 530 is received at the remote interface server.

While not illustrated in FIG. 5, in some implementations, authentication operations may be performed in order to confirm or validate customer data. For example, the remote interface server or VAS server 160 may send a message to an inputted telephone number or email address. The message may include a code which then needs to be successfully input to the interface 600. The remote interface server 100 may validate the number input to the interface 600 to confirm that it matches the number sent to the telephone number or email address to confirm the authenticity of the number/email address. In at least some implementations, such validation is a precondition to enable the value-added service at the POS terminal. That is, if such validation fails, the value-added service is not enabled.

When it is determined that the transaction may be processed using the value-added service, the remote interface server 100 and/or the VAS server 160 may enable completion of the transaction using the value-added service. In some implementations, the value-added service may be enabled for the transaction by configuring an account associated with a transfer token to enable the value-added service for the transfer token when the transfer token is used to process the transaction at the point-of-sale terminal. The account configuration may be performed by sending a message to an issuer system 124 associated with the transfer token. In some instances, the issuer system 124 may be identified based on customer data received through the interface. For example, as noted above, in some instances the interface may prompt for input of token data, such as a primary account number, and the issuer system 124 may be identified based on the primary account number.

In some implementations, in order to enable the value-added service for the transaction, one or more messages may be sent from the VAS server 160 and/or the remote interface server 100 to the customer device 150 and/or the POS terminal 110. For example, enabling completion of the transaction using the value-added service may include provisioning a wallet on the device that scanned the machine-readable code with a transfer token to be used to complete the transaction using the value-added service. For example, a message 532 may be sent from the VAS server 160 or the remote interface server 100 to the customer device 150. The message 532 may be a provisioning message which causes the customer device 150 to, at operation 533, provision a wallet with a transfer token. The transfer token may be a payment token. The transfer token may be a single-use token or it may be used more than once. The transfer token may be used by the customer device 150 to provision the customer device 150 to use the transfer token. For example, the transfer token may be stored in a secure area of memory on the customer device 150.

In some implementations, enabling completion of the transaction using the value-added service may include sending an indication that the transaction is to be completed using the value-added service to the point-of-sale terminal. For example, a message 534 that includes such an indication may be sent from the remote interface server 100 to the POS terminal 110. This indication may cause the point-of-sale terminal to complete the transaction using the value-added service. For example, the indication may cause the point-of-sale terminal to display, at an operation 536, a prompt to use a particular transfer token to complete the transaction. The particular transfer token may be associated with the value-added service. In some implementations, the particular transfer token is the token that was provisioned on customer device 150 with the message 534.

In some implementations, the remote interface server 100 may push the message 534 that configures the point-of-sale terminal 110. In other implementations (not shown), the message may be provided using a pull technique. For example, the POS terminal may send a message to the remote interface server 100. The message is a request for an indication of whether the value-added service is to be enabled. The request may be sent periodically (e.g., the POS terminal 110 may repeatedly attempt to retrieve the indication of the one or more parameters indicating how the transaction is to be split from the remote interface server 100 until it becomes available) or it may be sent in response to input received at an input module of the POS terminal. The input indicates readiness to complete the transaction. For example, it may be that the operator of the POS terminal, who is an employee of the merchant, provides an input at the POS terminal after their customer has indicated that they have finished providing input through the interface 600 provided on the customer device 150. Then, when the POS terminal 110 receives such input, it may send the message requesting the indication of whether the transaction is to be completed using the value-added service and, in response to receiving such a request, the message 534 containing the indication may be sent to the POS terminal 110.

In some instances, the message 534 may be sent to the POS terminal based on an identifier such as the POS identifier and/or the transaction identifier.

The POS terminal 110 receives the message 534 (and thus, the indication of the response to the prompt) and displays, at 536, a transaction completion prompt based on the message. The transaction completion prompt may, as noted previously, prompt the customer to use a particular transfer token. By way of example, the prompt may be "Tap your mobile device having the VAS token to use the VAS."

In some implementations, a new transfer token may not be provisioned on the customer device 150 in order to enable the value-added service. Instead, an account associated with an existing transfer token may be configured to enable the value-added service. For example, an existing payment card may be configured such that when that payment card is used for the transaction, the value-added service will be used to process the transaction. In at least some implementations, the prompt displayed at operation 536 may indicate the specific transfer token that is to be used (e.g., "To complete the transaction using the value-added service, tap your Visa™ card ending in 5555").

The prompt displayed at operation 536 prompts the customer to engage a physical token reader using a physical token. Such physical tokens may be configured for tap-style payments in which the physical token is placed in a communication range of a physical token reader to allow physical token data to be read from the physical token. By way of example, physical tokens may include any one or a combination of: payment cards (which may also be referred to as value transfer cards) and computing devices having a representation of a payment card stored thereon. By way of example, the physical token may be a mobile device having a mobile wallet that stores a representation of a payment card.

A physical token may be connected to one or more accounts (such as banking accounts) that store data and/or resources accessible to the cardholder. By way of example, the physical token may be associated with a bank account and/or a credit card account. The physical token may act as a credit card or a debit card.

The physical token may be configured for near-field communication (NFC) payment processing or for wireless communication-based payment processing of another type.

A customer may manipulate their physical token in accordance with the prompt to allow the POS terminal 110 to read the physical token. The POS terminal obtains physical token data from the physical token at 538. Physical token data may include, for example, a PAN, an expiry date, verification data (e.g., a CVV number) and/or a token holder. The token holder may identify an entity that the token was issued to and/or is associated with.

The POS terminal 110 then sends a transaction processing request to an appropriate transfer rail 120 in a message 540. The POS terminal 110 may identify the appropriate transfer rail based on the physical token data and may send the message 540 to the identified transfer rail 120. The transaction processing request may include or be based on the physical token data. The transaction processing request includes an amount of the transaction.

The transfer rail 120 then identifies an issuer system 124 to relay the message to based on the physical token data in the message 540. The transfer rail 120 then relays the message to the identified issuer system 124 as a message 542.

The issuer system 124 performs a real-time adjudication procedure based on the message 542 in order to instantly determine whether the transaction is to be approved or declined. The issuer system 124 may identify the transaction as one that is to be processed using the value-added service and may process the transaction using the value-added service (at operation 544). Processing the transaction using the value-added service may, in some instances, affect one or more of: the speed at which the transaction is processed, the number of loyalty points earned by completing the transaction, a time at which a notification will be triggered, etc. By way of example, in at least some implementations, when the value-added service is used, a notification that is otherwise generated by a computer system may be suppressed. Such suppression may be for a defined period of time or it may be indefinitely suppressed.

The issuer system 124 may identify that the transaction is one that is to be processed using the value-added service based on data included in the message 542. By way of example, any one or more of the amount of the transaction, a merchant identifier, POS identifier, transaction identifier, etc. may be used to determine that the transaction is one that is to be processed using the value-added service. In some implementations, the issuer system 124 may identify that the transaction is one that is to be processed using the value-added service based on the transfer token that was used. That is, the token data that is included in the message 542 may be used to determine whether the transaction is to be processed using the value-added service. For example, the issuer system may compare the token data to token data associated with an account that was configured to enable the value-added service. Or, where the transfer token is a single use token that was loaded on the customer device 150 for processing the transaction, the issuer system may identify the transfer token as one that is configured to use the value-added service.

Then, the issuer system 124 sends an indication of whether the transaction was approved or declined in a message 546 through the transfer rail 120. The transfer rail 120 then relays this message to the POS terminal 110 as a message 548. The POS terminal then, at 550, displays a transaction result indicator, indicating whether the transaction was approved or declined. The result indicator may also indicate whether the transaction was processed using the value-added service.

One or more of the messages referred to above may, in some implementations, be split into multiple messages.

Each of the systems illustrated in FIG. 5 may be considered to perform an associated method. By way of example, the issuer system 124 performs a method that includes the operations described as being performed by the issuer system 124 or a portion thereof, the transfer rail 120 performs a method that includes the operations described as being performed by the transfer rail 120 or a portion thereof, the VAS server 160 performs a method that includes the operations described as being performed by the VAS server 160, the POS terminal 110 performs a method that includes the operations described as being performed by the POS terminal 110 or a portion thereof, the remote interface server 100 performs a method that includes the operations described as being performed by the remote interface server 100 or a portion thereof, and the customer device 150 performs a method that includes the operations described as being performed by the customer device 150 or a portion thereof. A memory associated with each of these systems may include computer-executable instructions which, when executed, configure the associated system to perform the associated method, or a portion thereof.

Figure 8:
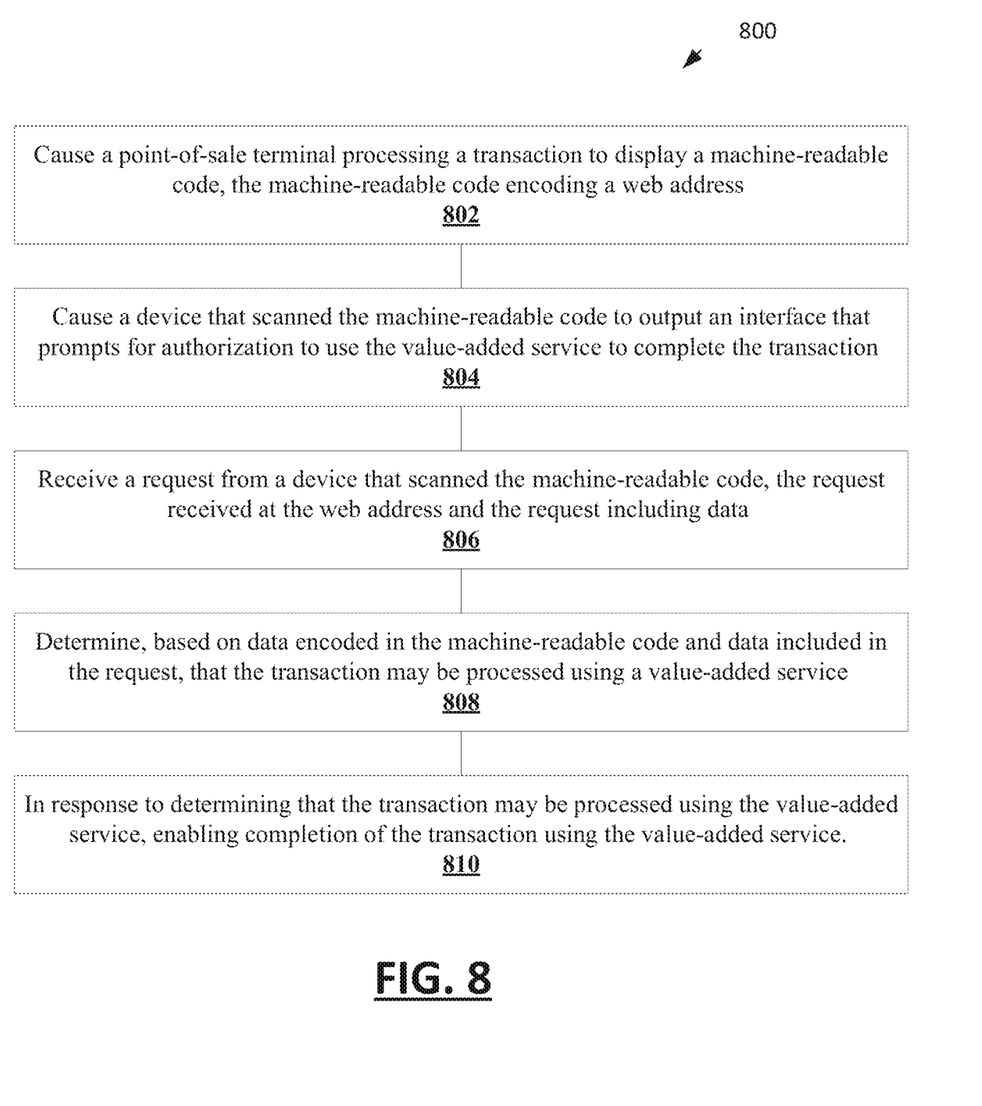
FIG. 8 illustrates, in flowchart form, an example method that may be performed by a server.

By way of example, reference is now made to FIG. 8, which shows, in flowchart form, an example method 800 that may be performed by a remote interface server 100.

Operations starting with operation 802 and continuing onward are performed by the processor 210 (FIG. 2) of a computing device 200 executing software comprising instructions such as may be stored in the memory 220 of the computing device 200. For example, the operations of the method 800 may be performed by the remote interface server 100. More particularly, processor-executable instructions may, when executed, configure a processor 210 of the remote interface server 100 to perform the method 800. In some embodiments, the operations of method 800 may be performed by the remote interface server 100 in conjunction with one or more other computing systems, such as the POS terminal 110 and/or a customer device 150.

The operations 802 and onward may be the same or similar to those described above with reference to the sequence diagram 500 of FIG. 5 and the discussion of the operations 802 and onward will be made by reference to the operations in the sequence diagram 500.

At an operation 802, the remote interface server 100 may cause a point-of-sale terminal processing a transaction to display a machine-readable code. The machine-readable code may encode a web address. Operation 802 may be performed in the manner described above with reference to operations 502 to 510 of the sequence diagram 500.

Next, at an operation 804, the remote interface server 100 may cause a device that scanned the machine-readable code to output an interface that prompts for authorization to use the value-added service to complete the transaction. Operation 804 may be performed in the manner described above with reference to operations 512 to 520 of the sequence diagram 500.

Next, at an operation 806, the remote interface server 100 may cause a device that scanned the machine-readable code to receive a request from a device that scanned the machine-readable code. The request may be received at the web address and the request including data. Operation 806 may be performed in the manner described above with reference to message 524 of the sequence diagram 500.

Next, at an operation 808, the remote interface server 100 may determine, based on data encoded in the machine-readable code and data included in the request, that the transaction may be processed using a value-added service. Operation 808 may be performed in the manner described above with reference to operations 526 to 530 of the sequence diagram 500.

Next, at an operation 810, the remote interface server 100 may, in response to determining that the transaction may be processed using the value-added service, enable completion of the transaction using the value-added service. Operation 810 may be performed in the manner described above with reference to operations 532 to 535 of the sequence diagram 500.

Conveniently, at least some methods and systems described herein may work with numerous types of customer equipment since the customer device 150 need only have the ability to scan a machine-readable code and a web browser to cooperate with other components described herein.

Further conveniently, at least some methods and systems described herein may be deployed through a software update to existing POS terminals without having to obtain all new POS terminals.

At least some methods and systems described herein may also be used, for example, to aid visually impaired users. As noted above, such customers may be presented with voice prompts instead of visual prompts on their customer device.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

The invention claimed is:

1. An interface server comprising:
a communications module;
a processor coupled with the communications module; and
a memory coupled to the processor and storing processor-executable instructions which, when executed by the processor, configure the interface server to:
receive, by the interface server and from a point-of-sale terminal processing a transaction, a code request message including a terminal identifier identifying the point-of-sale terminal;
generate, by the interface server, a machine-readable code encoding the terminal identifier as a parameter of a web address associated with the interface server, the web address for enabling completion of the transaction using a value-added service;
transmit, by the interface server and to the point-of-sale terminal, a message including the generated machine-readable code and cause the point-of-sale terminal processing the transaction to display the generated machine-readable code, the machine-readable code encoding the web address to be used to request the interface server to enable completion of the transaction using the value-added service;
receive, by the interface server and at the web address and from a device that scanned the machine-readable code, a message including the terminal identifier;
in response to receiving the message from the device and at the web address, provide to the device an interface for obtaining input indicating customer data and consent to enable the value-added service;
in response to receiving, by the interface server and from the device, a request including customer data based on input received through the interface, determine, based on the terminal identifier encoded in the web address, a list of unsupported merchants, data encoded in the machine-readable code and the customer data included in the request, that the transaction may be processed using the value-added service; and
in response to determining that the transaction may be processed using the value-added service, enable completion of the transaction using the value-added service by sending, to the point-of-sale terminal caused to display the machine-readable code, an indication that the transaction is to be completed using the value-added service in order to cause the point-of-sale terminal to complete the transaction using the value-added service.

2. The server of claim 1, wherein the processor-executable instructions further configure the server to:
cause the device that scanned the machine-readable code to output an interface that prompts for authorization to use the value-added service to complete the transaction; and
receive, from the device that scanned the machine-readable code and through the interface, an indication of authorization to use the value-added service,
and wherein enabling completion of the transaction using the value-added service includes, configuring an account associated with a transfer token to enable the value-added service for the transfer token when the transfer token is used to process the transaction at the point-of-sale terminal.

3. The server of claim 1, wherein determining that the transaction may be processed using the value-added service comprises:
sending a value-added service availability request to a value-added service server, the value-added service availability request including at least some of the data encoded in the machine-readable code and the customer data included in the request; and
receiving, from the value-added service server, a response to the value-added service availability request, the response indicating that the transaction may be processed using the value-added service.

4. The server of claim 3, wherein the machine-readable code encodes an amount of the transaction and wherein the value-added service availability request includes the amount of the transaction.

5. The server of claim 1, wherein the customer data included in the request which is used to determine that the transaction may be processed using the value-added service includes one or both of a name and a phone number.

6. The server of claim 1, wherein the customer data included in the request which is used to determine that the transaction may be processed using the value-added service includes a phone number.

7. The server of claim 1, wherein the determining that the transaction may be processed using a value-added service is based on one or more of:
a name included in the customer data included in the request;
a merchant identifier associated with the machine-readable code;
a telephone number included in the customer data included in the request; and
an amount of the transaction encoded in the machine-readable code.

8. The server of claim 1, wherein enabling completion of the transaction using the value-added service includes provisioning a wallet on the device that scanned the machine-readable code with a transfer token to be used to complete the transaction using the value-added service.

9. The server of claim 1, wherein causing the point-of-sale terminal to complete the transaction using the value-added service includes causing the point-of-sale terminal to display a prompt to use a particular transfer token to complete the transaction, the particular transfer token being associated with the value-added service.

10. The server of claim 1, wherein the value-added service enables a transfer deferral that is not enabled without use of the value-added service.

11. The server of claim 1, wherein determining, based on data encoded in the machine-readable code and the customer data included in the request, that the transaction may be processed using the value-added service is based on whether the customer represented by the customer data has used the value-added service in the past.

12. The server of claim 1, wherein determining, based on data encoded in the machine-readable code and the customer data included in the request, that the transaction may be processed using the value-added service is based on whether the customer represented by the customer data has an ongoing obligation associated with a past use of the value-added service.

13. The server of claim 1, wherein determining, based on data encoded in the machine-readable code and the customer data included in the request, that the transaction may be processed using the value-added service is based on whether the customer represented by the customer data has broken a rule associated with use of the value-added service in the past.

14. The server of claim 1, wherein determining, based on data encoded in the machine-readable code and the customer data included in the request, that the transaction may be processed using the value-added service includes identifying a customer based on the customer data and determining whether the identified customer is eligible for the value-added service.

15. The server of claim 1, wherein determining, based on data encoded in the machine-readable code and the customer data included in the request, that the transaction may be processed using the value-added service is based on a merchant identifier satisfying predetermined criteria requiring the merchant identifier not correspond to a merchant on the list of unsupported merchants.

16. The server of claim 1, wherein determining, based on data encoded in the machine-readable code and the customer data included in the request, that the transaction may be processed using the value-added service is based on itemized receipt data satisfying predetermined criteria.

17. A method performed at an interface server, the method comprising:
receive, by the interface server and from a point-of-sale terminal processing a transaction, a code request message including a terminal identifier identifying the point-of-sale terminal;
generate, by the interface server, a machine-readable code encoding the terminal identifier as a parameter of a web address associated with the interface server, the web address for enabling completion of the transaction using a value-added service;
transmit, by the interface server and to the point-of-sale terminal, a message including the generated machine-readable code and causing the point-of-sale terminal processing the transaction to display the generated machine-readable code, the machine-readable code encoding the web address to be used to request the interface server to enable completion of the transaction using the value-added service;
receiving, by the interface server and at the web address and from a device that scanned the machine-readable code, a message including the terminal identifier;
in response to receiving the message from the device and at the web address, providing to the device an interface for obtaining input indicating customer data and consent to enable the value-added service;
in response to receiving, by the interface server and from the device, a request including customer data based on input received through the interface, determining, based on the terminal identifier encoded in the web address, a list of unsupported merchants, data encoded in the machine-readable code and the customer data included in the request, that the transaction may be processed using the value-added service; and
in response to determining that the transaction may be processed using the value-added service, enabling completion of the transaction using the value-added service by sending, to the point-of-sale terminal caused to display the machine-readable code, an indication that the transaction is to be completed using the value-added service in order to cause the point-of-sale terminal to complete the transaction using the value-added service.

18. The method of claim 17, further comprising:
causing the device that scanned the machine-readable code to output an interface that prompts for authorization to use the value-added service to complete the transaction; and
receiving, from the device that scanned the machine-readable code and through the interface, an indication of authorization to use the value-added service,
and wherein enabling completion of the transaction using the value-added service includes, configuring an account associated with a transfer token to enable the value-added service for the transfer token when the transfer token is used to process the transaction at the point-of-sale terminal.

19. The method of claim 17, wherein determining that the transaction may be processed using the value-added service comprises:
sending a value-added service availability request to a value-added service server, the value-added service availability request including at least some of the data encoded in the machine-readable code and the customer data included in the request; and
receiving, from the value-added service server, a response to the value-added service availability request, the response indicating that the transaction may be processed using the value-added service.

20. The method of claim 19, wherein the machine-readable code encodes an amount of the transaction and wherein the value-added service availability request includes the amount of the transaction.

* * * * *